United States Patent [19]  
Gerlach

[11] 3,832,872  
[45] Sept. 3, 1974

[54] TRAILER COUPLING PIN LOCK COLLAR
[75] Inventor: John R. Gerlach, Monterey Park, Calif.
[73] Assignee: Emhart Corporation, Bloomfield, Conn.
[22] Filed: Aug. 13, 1973
[21] Appl. No.: 388,107

[52] U.S. Cl. ............................................... 70/232
[51] Int. Cl. ........................ B60r 25/00, F16b 41/00
[58] Field of Search ............. 70/232, 416, 424, 428, 70/DIG. 58

[56] References Cited
UNITED STATES PATENTS

| | | | |
|---|---|---|---|
| 2,641,124 | 5/1953 | Gallagher et al. | 70/232 |
| 2,883,850 | 4/1959 | Falck | 70/431 |
| 3,763,675 | 10/1973 | Hofmeister et al. | 70/232 |

Primary Examiner—Albert G. Craig, Jr.  
Attorney, Agent, or Firm—Mahoney, Schick & Cislo

[57] ABSTRACT

A cylindrical collar is received upwardly telescoped over the downwardly projecting trailer coupling pin and a U-shaped keeper is slidably received through the collar movable between pin engaging and disengaging positions. In the keeper pin engaging position, leg portions thereof span opposite portions of the collar opening passing through opposite portions of the usual annular recess of the coupling pin thereby retaining the collar over the coupling pin preventing the coupling pin from engaging a trailer pulling tractor. A lock through a pivotal cam bar slides a locking bar transversely into engagement with the keeper when the keeper is in its pin engaging position thereby locking the keeper in such pin engaging position.

10 Claims, 7 Drawing Figures

PATENTED SEP 3 1974 3,832,872

TRAILER COUPLING PIN LOCK COLLAR

BACKGROUND OF THE INVENTION

This invention relates to a lock collar for a usual trailer coupling pin which, when locked in assembly with the trailer coupling pin prevents the trailer coupling pin from engaging in the usual fifth wheel of a trailer pulling tractor. More particularly, this invention relates to such a lock collar making use of a U-shaped keeper which may be slid within the collar from a coupling pin non-engaging position permitting telescoping of the collar over the coupling pin into a coupling pin engaging position passing through opposite portions of the coupling pin usual annular recess so as to interfere with collar removal and thereby retain the assembly. Subsequent locking of the U-shaped keeper in this coupling pin engaging position by use of certain internal mechanism of the collar completes securement of the assembly. Thus, with the lock collar in place, the trailer coupling pin is prevented from engaging in a usual fifth wheel of a trailer pulling tractor and the trailer, therefore, cannot be transported by unauthorized persons.

With the rising crime rate in modern times, one troublesome area of thievery is the surreptitious removal of entire freight transporting trailers from freight storage yards, the pulling of the same to a secluded area and the removal of the valuable freight loaded therein with the empty trailer normally being later abandoned. It is well known that the usual large, freight carrying semi-trailers normally transported by the usual truck tractors are stored in freight yards during both of loaded awaiting either unloading or transportation on the usual retractable supporting wheels. In such condition, it is only necessary for freely transporting these loaded trailers to back a trailer pulling tractor with the fifth wheel thereof moved into engagement by the trailer coupling pin, quickly retracting the storage wheels and transporting the trailer away. Necessarily, for practical tractor and trailer complete interchangability required for efficiently carrying out the freight transporting operations, the coupling means between tractors and trailers must be uniform, meaning that virtually any tractor will serve for virtually any trailer. As a result, these illicit hijacking operations are difficult of frustration.

The most obvious solution to this basic problem is the alteration of the stored trailer coupling pin on a temporary basis preventing engagement thereof by the usual fifth wheels of tractors until authorized transportation of the trailer is intended. This temporary alteration of the trailer coupling pins can be accomplished by assembling thereover an obstructing collar of one form or another and locking the same in place. With the obstructing collar over the trailer coupling pin, coupling between the tractor and trailer cannot be accomplished so that it is impossible to move the trailer.

Various forms of such trailer coupling pin guarding collars have heretofore been provided, none of which have been completely satisfactory for various reasons. For instance, it must be kept in mind that the form of trailers involved are large and massive and the coupling pins thereof must likewise be relatively large. This, in turn, requires any guarding collar that is to be assembled over the trailer coupling pins virtually completely covering the same must be of sufficient size to accomplish the intended purpose, yet capable of quick and easy engagement over the coupling pins with a minimum of effort.

One prior form of collar construction intended for the recited purposes is formed of two totally separable halves, one half having pins projecting therefrom receivable in the other half during the final assembly around the trailer coupling pin. Furthermore, after the assembly of these two halves around the trailer coupling pin, a further separable pin must be inserted in one of the halves and locked in place to finally positively secure the overall assembly. This prior construction is obviously relatively complex in structure and, more important, requires extensive manipulation of various separable parts difficult for a single worker to carry out such assembly. Furthermore, even with the necessary assistance during assembly, the assembly operation is relatively tedious and, therefore, objectionable.

Certain others of the prior constructions have made use of unitary collars which may be conveniently slipped upwardly over the trailer coupling pins into final assembled place. The major difficulties with these unitary forms of collars have been with the mechanisms provided for then securing the collars in their coupling pin positions. In all cases, these engagement and locking mechanisms have been formed by the shackles of conventional padlocks or by single projectable bolts of conventional lock form, in either form providing only a single and slight engagement with the trailer coupling pin to be guarded in order to retain the overall assemblies in place. Not only are these engagements relatively slight and therefore of greatly reduced security, but with the engagements to be performed by the mechanisms described, such mechanisms have been objectionably exposed exteriorly of the collars so as to be subject to easier devised methods of attack.

OBJECTS AND SUMMARY OF THE INVENTION

It is, therefore, an object of this invention to provide a lock collar for trailer coupling pins efficiently performing the foregoing discussed functions which is formed basically of a one piece collar and may be quickly telescoped over a downwardly projecting coupling pin of a tractor pulled semi-trailer, and once the lock collar is placed in trailer coupling pin engaged and locked position, all of the vital components thereof providing such engagement and secure retainment are completely inaccessible without a complete distruction of the lock collar. In use of a preferred embodiment of the present invention, a preferably cylindrical collar is telescoped upwardly over the trailer coupling pin, a keeper is slid into engaged position engaging the trailer coupling pin and retaining the collar in place and by quick manipulation of an internal locking bar, preferably through pivoting of a conventional lock, the lock collar and coupling pin assembly is complete. After such engaged and locked assembly, the only thing exposed beyond the surface of the cylindrical collar is a slightly projecting portion of the keeper which could be removed by an unauthorized person attempting to gain access without in any way disturbing the engaged and locked assembly.

It is a further object of this invention to provide a lock collar for trailer coupling pins of the foregoing general type which makes use of a relatively simple form of collar, yet by integration therewith of a uniquely assembled and uniquely coupling pin engaging, U-shaped keeper, opposite sides of the trailer coupling pin are engaged over a maximum area for superior resistance against lock assembly removal, again without a complete destruction of the basic simple collar. As stated, the preferred form of keeper integrated with the preferably cylindrical collar is U-shaped and is slidably mounted in the collar movable from a position in which it is withdrawn from the collar central opening during which the collar may be telescoped upwardly over the downwardly projected trailer coupling pin placing the coupling pin within the collar opening. Thereafter, the U-shaped keeper is slid into the collar into an engaged position in which the leg portions of the keeper project across or span opposite portions of the collar opening during which such leg portions also are engaged through opposite portions of the usual annular recess of the trailer coupling pin. In this manner, the leg portions of the keeper engage maximum portions of the coupling pin to provide a maximum of engaged security while still retaining the basic simplicity of the lock collar.

It is still a further object of this invention to provide a lock collar for trailer coupling pins having all of the foregoing attributes while still being formed as an integrated assembly of maximum compactness and which is positive and simple of operation. As pointed out in the foregoing, once the lock collar of the present invention in the preferred form is in its engaged position secured with and functionally obstructing a trailer coupling pin so as to serve its intended purpose, the only thing basically exposed is the outer surface of the cylindrical collar, the exposed portion of the keeper not being of functional consequence. Furthermore, the engagement securing operation is accomplished by merely two simple steps, first sliding the keeper to its engaged position and then pivoting a lock to its locked position.

DESCRIPTION OF THE BEST EMBODIMENT CONTEMPLATED

Figure 1:
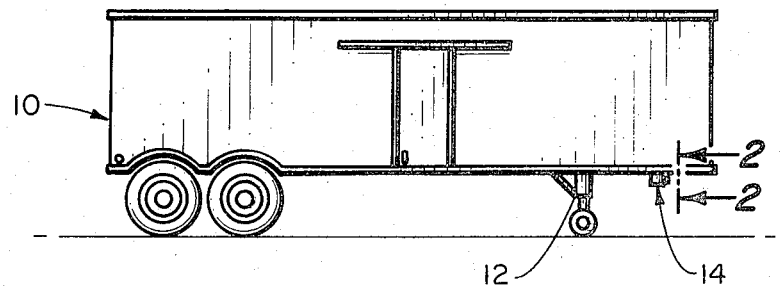
FIG. 1 is a side elevational view of a typical tractor pulled semi-trailer in stored position and having a preferred embodiment of the lock collar of the present invention installed thereon guarding the coupling pin thereof.

Referring to the drawings, a representative tractor pulled semi-trailer is shown in FIG. 1 generally indicated at 10 in stored condition free of the tractor (not shown) supported on usual retractable storage wheels 12 as would be the case of the trailer stored in a usual freight storage yard loaded with freight therein and awaiting either unloading or transportation by the tractor from the storage yard to another location. Furthermore, as shown in FIG. 1, an embodiment of a lock collar generally indicated at 14, according to the principles of the present invention, is positioned engaged and locked over a usual coupling pin generally indicated at 16 (FIGS. 2 through 4) of the trailer 10, the coupling pin serving the usual purpose when not covered by the lock collar 14 of engaging with a typical fifth wheel of the tractor during transportation of the trailer by the tractor. As shown, for instance, in FIGS. 2 through 4, the coupling pin 16 includes a usual annular recess 18 separating upper and lower enlarged end portions 20, the coupling pin projecting downwardly from a front portion of the trailer and being automatically engageable by the tractor fifth wheel in the usual manner.

Figure 2:
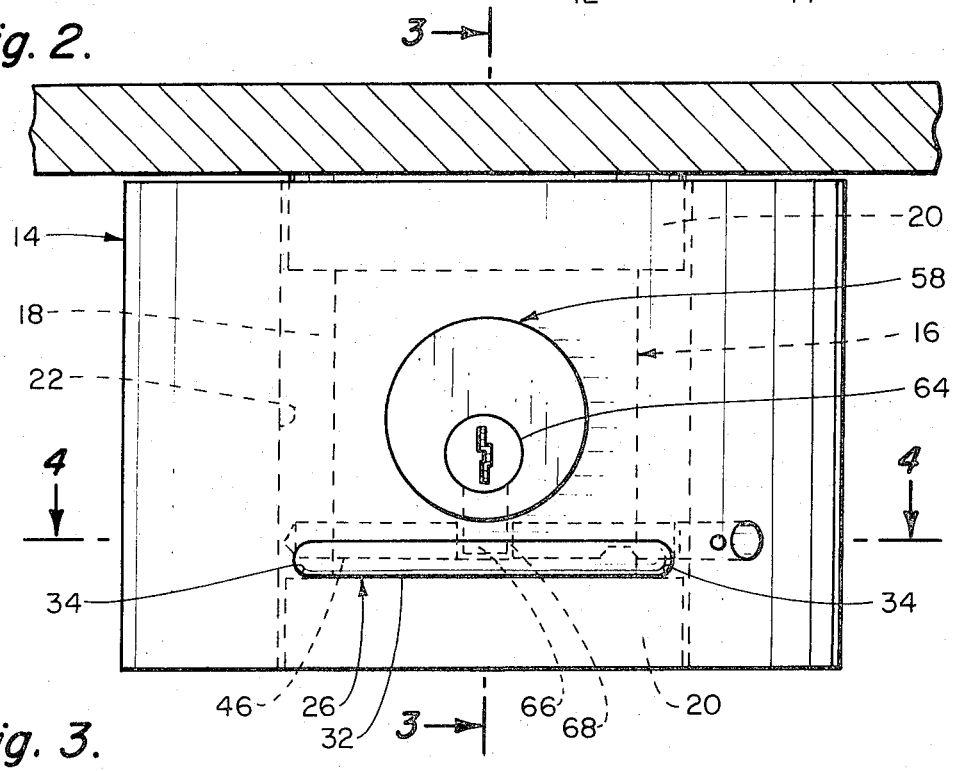
FIG. 2 is an enlarged, vertical sectional view looking in the direction of the arrows 2—2 in FIG. 1 and showing the lock collar in front elevation and in coupling pin engaged and locked position.
Figure 3:
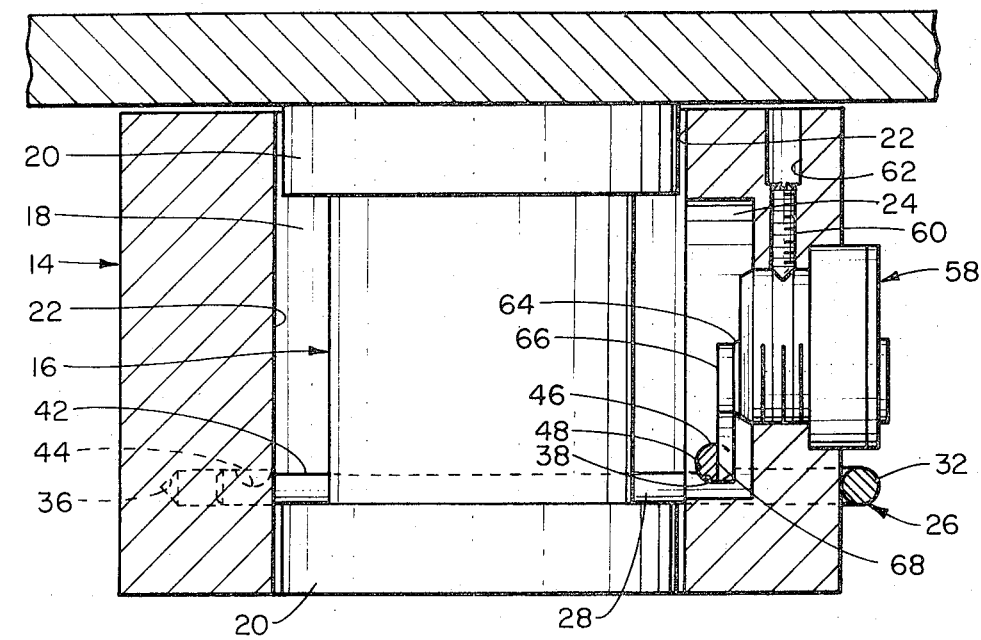
FIG. 3 is a fragmentary, vertical sectional view looking in the direction of the arrows 3—3 in FIG. 2.
Figure 4:
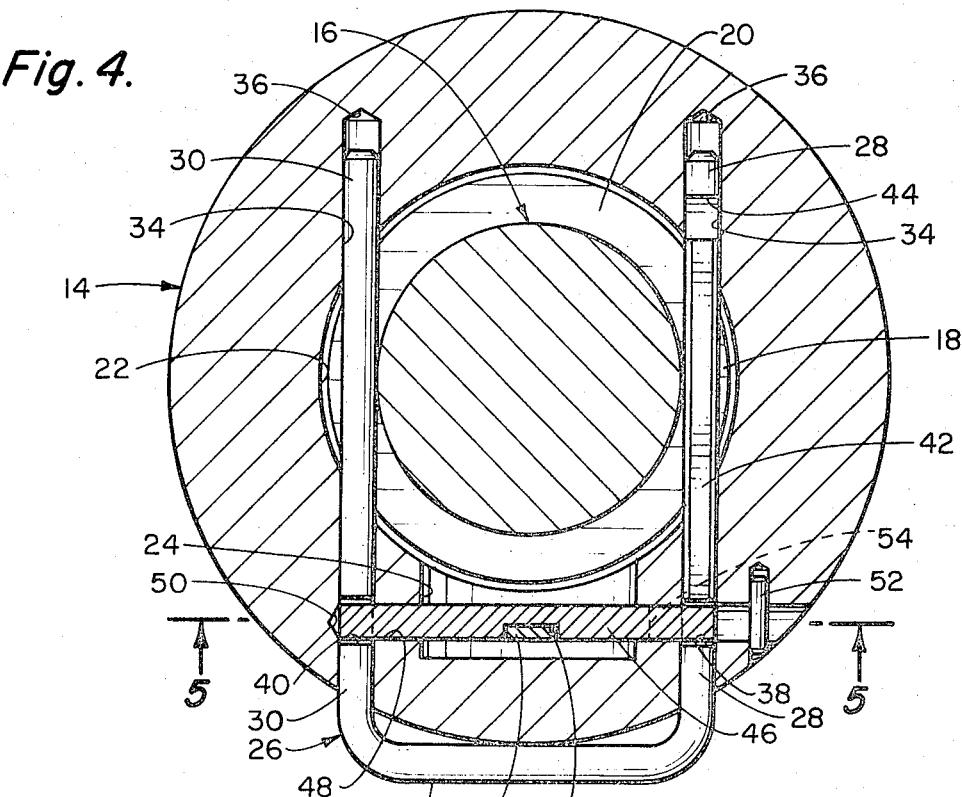
FIG. 4 is a horizontal sectional view looking in the direction of the arrows 4—4 in FIG. 2.

As shown in FIGS. 2 through 4, the lock collar 14 of the present invention is generally of a cylindrical form having a center opening 22 cylindrically configured and dimensioned for telescoping of the collar upwardly over the trailer coupling pin 16 and substantially covering the same. The collar 14 may be of plain, hollow cylindrical form as shown with the exception of an inner lock chamber 24 formed opening radially into the center opening 22 but totally axially enclosed both upwardly and downwardly as best seen in FIGS. 3 and 4 for a purpose which will be hereinafter more apparent. Furthermore, the lock collar 14 including the various assembled components thereof to be hereinafter described is preferably formed of steel, the grade and hardening thereof to be determined by the security required.

A generally U-shaped keeper generally indicated at 26 formed with parallel leg portions 28 and 30 joined by a connecting portion 32 has the leg portions slidably received in leg portion openings 34 of the collar 14 straddling the lock chamber 24 near the lower extremity thereof. The leg portion openings 34 open outwardly of the collar 14 oppositely adjacent the location of the lock chamber 24 and extend through the wall of the collar, through diametrically opposite portions of the collar center opening 22 and again into the wall of the collar 14 terminating short of the collar outer surface so as to have closed ends 36. Therefore, when the keeper 26 is moved or slid from a coupling pin disengaged position withdrawn such that the leg portions 28 and 30 are merely slightly projecting into the collar 14, but withdrawn from or free of interference with the collar center opening 22 as shown in FIG. 6, into a pin engaging position fully inserted into the leg portion openings 34 extending across the collar center opening 22 as shown in FIG. 4, these leg portions 28 and 30 will diametrically oppositely engage in the annular recess 18 of the coupling pin 16 across or in interference with the coupling pin lower end portion 20 when the lock collar 14 is positioned telescoping the coupling pin 16.

Figure 6:
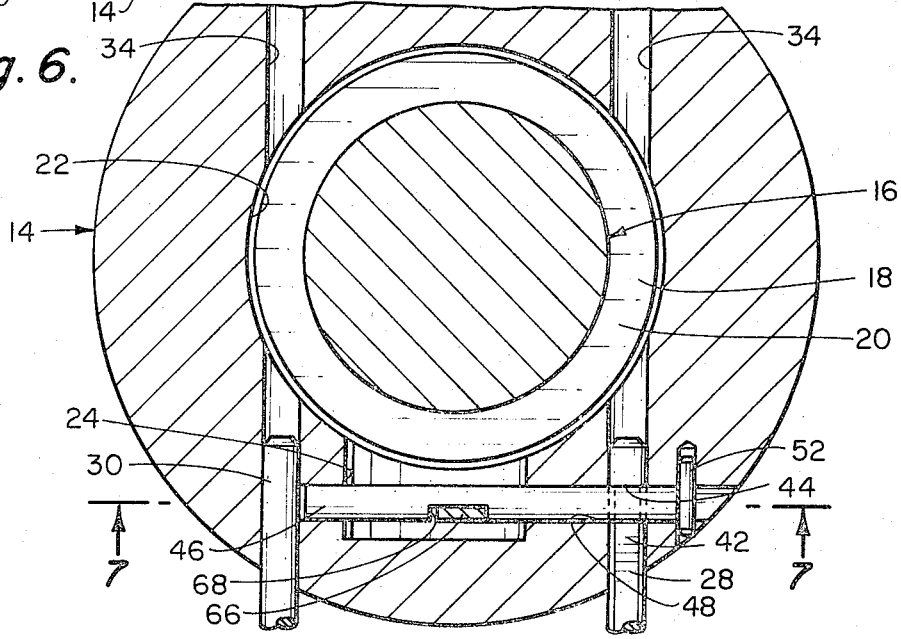
FIG. 6 is a fragmentary, horizontal sectional view similar to FIG. 4, but with the keeper of the lock collar in disengaged position.

More particularly, as shown in FIG. 6, with the keeper 26 withdrawn in pin disengaging position so that the keeper leg portions 28 and 30 are free of interference with the collar center opening 22 and the keeper connecting portion 32 is spaced from the collar 14, the collar 14 may be telescoped upwardly over the downwardly projecting coupling pin 16 of the trailer 10. As soon as full telescoping has taken place, the keeper 26 may be slid or moved fully inwardly as shown in FIG.

4 until the keeper connecting portion 32 abuts the outer surface of the collar 14 placing the keeper in pin engaging position. In this latter position, the keeper leg portions 28 and 30 have lengthwise spaced engagement with the collar 14 spanning across the collar center opening 22 through diametrically opposite portions of the coupling pin annular recess 18 so that if the collar 14 is now released, it will be supported telescoped over the coupling pin 16 covering the same by the keeper leg portions 28 and 30 downwardly abutting the coupling pin lower end portion 20 as shown in FIG. 3. Basically, the keeper 26 is preferably formed of formed cylindrical metal rod so as to basically have a circular cross section as shown except as hereinafter pointed out.

Furthermore, transversely aligned, upwardly opening, arcuate slots or notches 38 and 40 are formed in the keeper leg portions 28 and 30, respectively, near the keeper connecting portion 32, but spaced inwardly therefrom so as to be transversely aligned with an intermediate portion of the lock collar lock chamber 24 when the keeper 26 is inwardly in its pin engaging position as shown in FIG. 4. Outwardly of the slot 38 in the leg portion 28 toward the keeper connecting portion 32, the keeper leg portion 28 is circular in cross section, but inwardly of the slot 38, the keeper leg portion 28 has an upwardly facing, lengthwise flat 42 formed thereon extending toward the leg portion free end and terminating spaced forwardly of the leg portion free end in a secondary transverse slot 44 similar to the forwardly positioned slot 38. The keeper leg portion 30 is circular in cross section throughout the length thereof both forwardly and rearwardly of the slot 40.

A transversely extending, preferably straight locking bar 46 is endwise slidably or movably received internally of the lock collar 14 in a locking bar opening 48, said locking bar opening opening outwardly of the lock collar adjacent the keeper leg portion 28, transversely partially intersecting the leg portion 28, transversely intersecting the lock collar lock chamber 24 and transversely partially intersecting the keeper leg portion 30 terminating in a closed end 50 at the keeper leg portion 30. The locking bar 46 is of a predetermined length such that after the locking bar is lengthwise inserted in the locking bar opening 48, a positioning pin 52 is received in the lock collar 14 across the locking bar opening blocking removal of the locking bar from the locking bar opening and limiting the lengthwise movement of the locking bar between the keeper securing position shown in FIGS. 4 and 5 and a keeper non-securing position shown in FIGS. 6 and 7. In the keeper securing position shown in FIGS. 4 and 5, a lower segment of a circular cross section of the locking bar 46 slides transversely across and is received engaged in the respective slots 38 and 40 of the keeper leg portions 28 and 30 when the keeper 26 is in its pin engaging position so that in this keeper securing position, the locking bar 46 locks the keeper in its pin engaging position.

Figure 5:
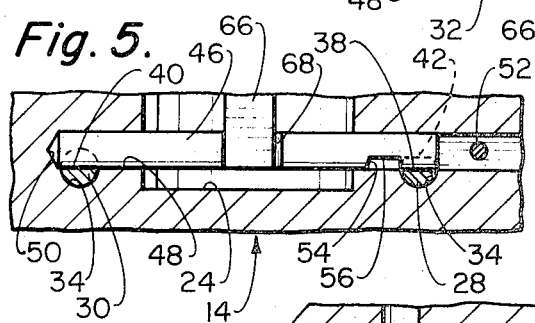
FIG. 5 is a fragmentary, vertical sectional view looking in the direction of the arrows 5—5 in FIG. 4.
Figure 7:
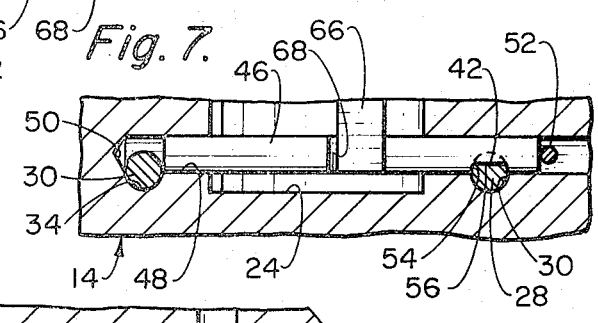
FIG. 7 is a fragmentary, vertical sectional view similar to FIG. 5, looking in the direction of the arrows 7—7 in FIG. 6.

When, however, the locking bar 46 is moved or slid to the right as viewed in FIGS. 4 through 7 from its keeper securing position shown in FIGS. 4 and 5 to its keeper non-securing position shown in FIGS. 6 and 7, the end of the locking bar at the keeper leg portion 30 is transversely withdrawn free of this leg portion, while a downwardly opening slot 54 of the locking bar is aligned with the keeper leg portion 28. The locking bar slot 54 is formed with an internal flat now downwardly facing the arcuate slot of the keeper leg portion 28, but more important, said flat 56 being capable of interfacing and sliding along the lengthwise flat 42 on the keeper leg portion 28 as the keeper is moved outwardly from its pin engaging to its pin disengaging position. Since the locking bar slot 54 has this flat 56 and is not fully arcuate or semicircular in cross section, this slot flat configuration causes the keeper leg portion 28 to engage with the locking bar 46 at either of the leg portion slots 38 or 44, that is, at either of the keeper pin engaging or disengaging positions, thereby limiting movement of the keeper 26 between these positions and particularly preventing full disengagement of the keeper outwardly of the lock collar 14 as shown in FIG. 6.

Actuating means for the internally mounted locking bar 46 includes lock means preferably in the form of a conventional, pin-type lock generally indicated at 58 which is positioned received through the wall of the lock collar 14 projecting inwardly into the lock chamber 24, as best seen in FIGS. 3 and 4. The lock 58 is retained in assembly with the lock collar 14 by a retention pin 60 threadably received in the lock collar downwardly engaging the lock through a pin opening 62 inaccessible upwardly when the lock collar is fully telescoped over the coupling pin 16 as shown in FIG. 3. The lock 58 has a usual key operated, pivotal lock cylinder 64 with a pivotal cam bar 66 secured thereto and pivotal therewith at the rearward extremity within the lock collar lock chamber 24.

The pivotal cam bar 66 extends downwardly within the lock collar lock chamber 24 and is downwardly engaged in a cam slot 68 of the locking bar 46. Thus, pivotal movement of the cam bar 66 by pivoting of the lock cylinder 64 through use of the proper key moves or slides the locking bar 46 between its keeper securing and non-securing positions. As shown in FIGS. 4 and 5, the lock cylinder 64 has been pivoted to its locked position moving the locking bar 46 through the cam bar 66 to the locking bar keeper securing position. As shown in FIGS. 6 and 7, the lock cylinder 64 has been pivoted to move the locking bar 46 to its keeper non-securing position.

In use of the illustrated embodiment of the lock collar for a trailer coupling pin of the present invention, therefore, once the coupling pin 16 of the trailer 10 has been disengaged from the tractor (not shown) and the trailer is in its stored position as shown in FIG. 1, the lock collar 14 with the U-shaped keeper 26 in its withdrawn pin disengaging position and the locking bar 46 in its keeper non-securing position as shown in FIGS. 6 and 7, the lock collar may be telescoped fully upwardly with the downwardly projecting coupling pin. Thereafter, the keeper 26 is inserted fully into the lock collar 14 transversely oppositely engaging the coupling pin 16 into the keeper pin engaging position and the locking bar 46 is moved to its keeper securing position by the lock 58 as shown in FIGS. 2 through 5. The trailer coupling pin 16 is thereby fully guarded against engagement thereof by a trailer pulling tractor so as to completely frustrate unauthorized movement of the trailer 10 until authorized. At this time, the lock 58 is manipulated by the proper key (not shown) moving the locking bar 46 back to its keeper non-securing position and the keeper 26 is withdrawn back to its pin disengaging position permitting removal of the lock collar 14 and engagement of the trailer coupling pin 16 by a tractor.

It will be particularly noted that as described and particularly shown in FIG. 4, the rearward ends of the keeper leg portion openings 34 in the lock collar 14 are the closed ends 36 so that in the pin engaging positions of the keeper leg portions 28 and 30, such leg portions are guarded against attack and although the keeper connecting portion 32 could be removed outwardly of the lock collar 14, this would not change the positioning of the keeper leg portions nor the securement of the coupling pin 16 by the lock collar 14. Additionally, with the locking bar opening 48 also having the closed end 50 at the keeper leg portion 30, once the locking bar 46 is inserted in assembled position retained by the positioning pin 52 and the cam bar 66, this locking bar is virtually free of attack. In view thereof, it is apparent that when the lock collar 14 is in its coupling pin covering and securing position, that is, with the keeper 26 in pin engaging position and the locking bar 46 in keeper securing position, the vital coupling securing parts of the lock collar are effectively guarded totally internally of the lock collar so as to be extremely difficult of attack and the lock collar basically presents merely a plain, outer cylindrical surface.

I claim:

1. In a lock collar construction for trailer coupling pins; the combination of: a collar having a generally vertical opening therein receivable upwardly telescoping a downwardly projecting trailer coupling pin having a generally horizontally circumscribing annular recess; a U-shaped keeper having leg portions received into said collar slidable between pin engaging and disengaging positions, said keeper leg portions in said pin engaging position spanning opposite portions of said collar opening through opposite portions of said pin recess retaining said collar telescoping said pin, and in said pin disengaging position being withdrawn free of said pin; locking bar means internally of said collar movable between a keeper securing and a keeper non-securing position, said locking bar means in said keeper securing position engaging at least one of said keeper leg portions in said keeper pin engaging position and retaining said keeper in said pin engaging position, said locking bar means in said keeper non-securing position permitting sliding of said keeper between said pin engaging and disengaging positions; actuating means operably connected to said locking bar means operable for selectively moving said locking bar means between its keeper securing and non-securing positions, said actuating means including lock means for locking said locking bar means in said keeper securing position.

2. In a lock collar construction as defined in claim 1 in which said locking bar means in said keeper securing position transversely engages both of said keeper leg portions in said keeper pin engaging position.

3. In a lock collar construction as defined in claim 1 in which said locking bar means is movable internally of said collar endwise between said keeper securing and keeper non-securing positions, said locking bar means in said keeper securing position transversely engaging endwise through slots formed in said keeper leg portions when said keeper is in said pin engaging position, said locking bar means at one end thereof being transversely withdrawn from one of said keeper leg portions when in said keeper non-securing position, said locking bar means having slot means formed therein aligned with the other of said keeper leg portions and permitting free movement of said keeper other leg portion therethrough between said keeper pin engaging and disengaging positions when said locking bar means is in said keeper non-securing position.

4. In a lock collar construction as defined in claim 1 in which said locking bar means is movable internally of said collar endwise between said keeper securing and keeper non-securing positions, said locking bar means in said keeper securing position transversely engaging endwise through slots formed in said keeper leg portions when said keeper is in said pin engaging position, said locking bar means at one end thereof being transversely withdrawn from one of said keeper leg portions when in said keeper non-securing position, said locking bar means having slot means formed therein aligned with the other of said keeper leg portions and permitting free movement of said keeper other leg portion therethrough between said keeper pin engaging and disengaging positions when said locking bar means is in said keeper non-securing position; and in which said keeper other leg portion has a flat thereon extending lengthwise thereof interfaced with a flat of said locking bar means groove when said locking bar means is in said keeper non-securing position, said keeper other leg portion flat extending lengthwise of said keeper other leg portion a determined distance permitting said keeper sliding between said pin engaging and disengaging positions, said keeper other leg portion flat terminating short of a free extremity of said keeper other leg portion with said keeper other leg portion extremity engaging said locking bar means upon sliding of said keeper to said pin disengaging position preventing complete withdrawal of said keeper from said collar.

5. In a lock collar construction as defined in claim 1 in which said actuating means includes a pivotal cam bar operably engaged with said locking bar means and pivotal to move said locking bar means between its keeper securing and non-securing positions.

6. In a lock collar construction as defined in claim 1 in which said actuating means includes said lock means having a rotatable lock cylinder, a cam bar operably connected to said lock means cylinder pivotal thereby, said cam bar having an end part operably engaged with said locking bar means and moving said locking bar means between said locking bar means keeper securing and non-securing positions during pivoting of said cam bar by said lock means cylinder.

7. In a lock collar construction as defined in claim 1 in which said locking bar means in said keeper securing position transversely engages both of said keeper leg portions in said keeper pin engaging position; and in which said actuating means includes a pivotal cam bar operably engaged with said locking bar means and pivotal to move said locking bar means between its keeper securing and non-securing positions.

8. In a lock collar construction as defined in claim 1 in which said locking bar means in said keeper securing position transversely engages both of said keeper leg portions in said keeper pin engaging position; and in which said actuating means includes said lock means having a rotatable lock cylinder, a cam bar operably connected to said lock means cylinder pivotal thereby, said cam bar having an end part operably engaged with said locking bar means and moving said locking bar means between said locking bar means keeper securing and non-securing positions during pivoting of said cam bar by said lock means cylinder.

9. In a lock collar construction as defined in claim 1 in which said locking bar means is movable internally of said collar endwise between said keeper securing and keeper non-securing positions, said locking bar means in said keeper securing position transversely engaging endwise through slots formed in said keeper leg portions when said keeper is in said pin engaging position, said locking bar means at one end thereof being transversely withdrawn from one of said keeper leg portions when in said keeper non-securing position, said locking bar means having slot means formed therein aligned with the other of said keeper leg portions and permitting free movement of said keeper other leg portion therethrough between said keeper pin engaging and disengaging positions when said locking bar means is in said keeper non-securing position; and in which said actuating means includes said lock means having a rotatable lock cylinder, a cam bar operably connected to said lock means cylinder pivotal thereby, said cam bar having an end part operably engaged with said locking bar means and moving said locking bar means between said locking bar means keeper securing and non-securing positions during pivoting of said cam bar by said lock means cylinder.

10. In a lock collar construction as defined in claim 1 in which said locking bar means is movable internally of said collar endwise between said keeper securing and keeper non-securing positions, said locking bar means in said keeper securing position transversely engaging endwise through slots formed in said keeper leg portions when said keeper is in said pin engaging position, said locking bar means at one end thereof being transversely withdrawn from one of said keeper leg portions when in said keeper non-securing position, said locking bar means having slot means formed therein aligned with the other of said keeper leg portions and permitting free movement of said keeper other leg portion therethrough between said keeper pin engaging and disengaging positions when said locking bar means is in said keeper non-securing position; and in which said keeper other leg portion has a flat thereon extending lengthwise thereof interfaced with a flat of said locking bar means groove when said locking bar means is in said keeper non-securing position, said keeper other leg portion flat extending lengthwise of said keeper other leg portion a determined distance permitting said keeper sliding between said pin engaging and disengaging positions, said keeper other leg portion flat terminating short of a free extremity of said keeper other leg portion with said keeper other leg portion extremity engaging said locking bar means upon sliding of said keeper to said pin disengaging position preventing complete withdrawal of said keeper from said collar.

* * * * *